United States Patent
Fujihira et al.

(10) Patent No.: US 7,642,310 B2
(45) Date of Patent: Jan. 5, 2010

(54) POLYESTER MOLDING FOR USE WITH A CASING

(75) Inventors: Yuko Fujihira, Kanagawa (JP); Tsutomu Noguchi, Kanagawa (JP); Hiroyuki Mori, Kanagawa (JP); Shinichiro Yamada, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/898,131

(22) Filed: Sep. 10, 2007

(65) Prior Publication Data

US 2008/0146697 A1 Jun. 19, 2008

Related U.S. Application Data

(62) Division of application No. 10/189,393, filed on Jul. 8, 2002, now Pat. No. 7,285,589.

(30) Foreign Application Priority Data

Jul. 9, 2001 (JP) ............................. 2001-208456
Apr. 24, 2002 (JP) ........................... P2002-121889

(51) Int. Cl.
*C08K 5/54* (2006.01)
*C08K 5/29* (2006.01)

(52) U.S. Cl. ..................... 524/442; 524/445; 524/447; 524/449; 524/451; 524/539

(58) Field of Classification Search ............... 524/442, 524/445, 447, 449, 451, 539
See application file for complete search history.

(56) References Cited

U.S. PATENT DOCUMENTS 5,302,437 A * 4/1994 Idei et al. ................. 428/32.22
6,107,378 A 8/2000 Imashiro et al.

FOREIGN PATENT DOCUMENTS

| EP | 99/029768 | 6/1999 |
|---|---|---|
| JP | 61 241354 A1 | 10/1986 |
| JP | 06-080872 A | 3/1994 |
| JP | 06-172620 A | 6/1994 |
| JP | 07-133435 A | 5/1995 |
| JP | 09-003150 A | 1/1997 |
| JP | 09-278994 A | 10/1997 |
| JP | 10-306215 | 11/1998 |
| JP | 2000-143781 A | 5/2000 |
| JP | 2001-089646 A | 4/2001 |
| JP | 2002-030208 A | 1/2002 |
| JP | 1 213 111 A1 | 6/2002 |
| JP | 1 213 111 A2 | 6/2002 |
| JP | 2003-089721 A | 3/2003 |

OTHER PUBLICATIONS

European Search Report dated Mar. 12, 2003.
"Handbook of Degradable Plastic", pp. 310 - 312, Published in May 26, 1995.

* cited by examiner

*Primary Examiner*—Ana L Woodward
(74) *Attorney, Agent, or Firm*—Rader, Fishman & Grauer PLLC

(57) ABSTRACT

By molding a biodegradable plastic material which is treated with a compound reactive to the active hydrogen in the biodegradable plastic material, a biodegradable plastic material and molding having long-term reliability are obtained.

6 Claims, 3 Drawing Sheets

F I G. 2 A
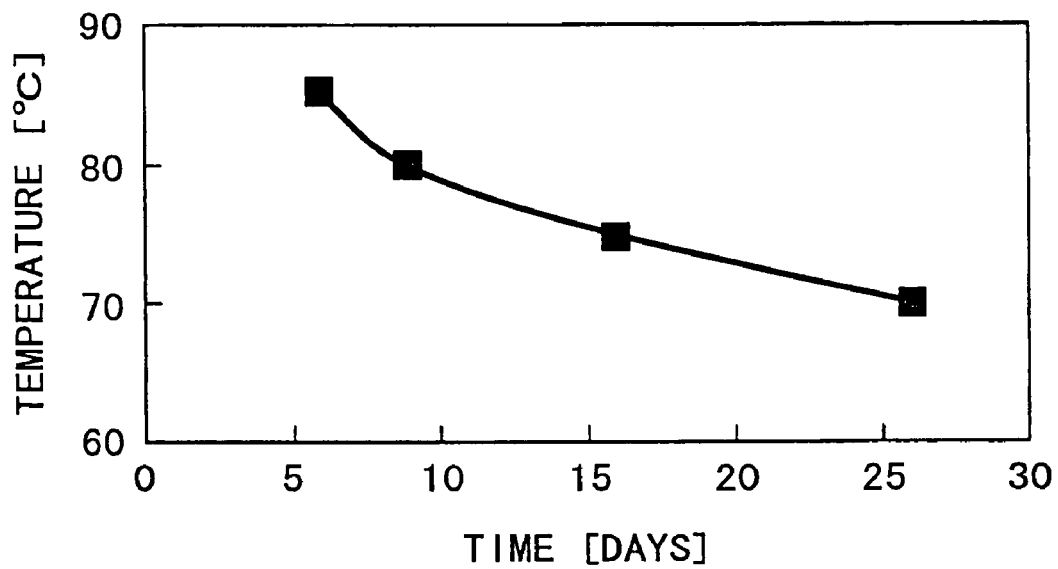
F I G. 2 B
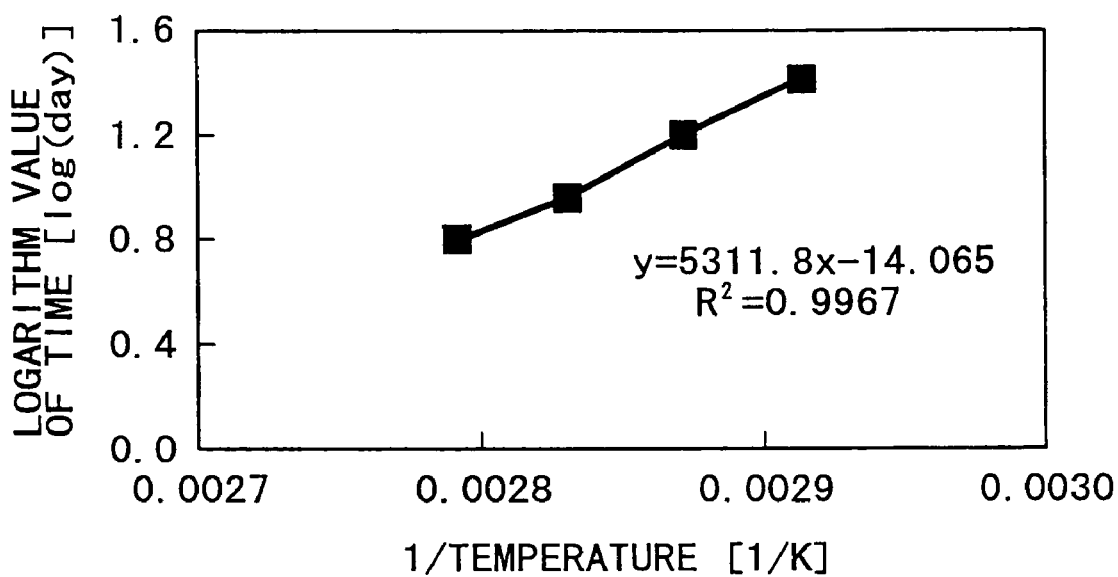

POLYESTER MOLDING FOR USE WITH A CASING

CROSS REFERENCE TO RELATED APPLICATIONS

The present application is a Divisional Application of the patent application Ser. No. 10/189,393, filed Jul. 8, 2002, which in turn claims priority from Japanese application Nos. 2001-208456, filed on Jul. 9, 2001 and 2002-121889, filed on Apr. 24, 2002, the entire contents of which are incorporated herein by reference.

BACKGROUND OF THE INVENTION

1. Field of the Invention

This invention relates to a biodegradable plastic material having improved durability and, also, a biodegradable plastic molding using same.

2. Description of the Related Art

Today, plastics are prevalent in all aspects of daily life and industry, and annual production of plastics all over the world has reached approximately one hundred million tons. The greater part thereof is disposed of after use, and this has been recognized as one of the factors causing disruption in the global environment. At present, recycling of plastics, as well as using biodegradable polymers, are attracting attention as measures for solving this problem.

With respect to recycling plastics, although the Law for Recycling of Specified Kinds of Home Appliances was enacted in Japan in April 2001 in order to recycle used electric appliances, the recycling of used electric appliances has been, at best, inadequate, with the exception of four kinds of large-sized electric appliances including televisions, refrigerators, air conditioners and washing machines. Instead, most electric appliances are disposed of as incombustible refuse. Also, when sold in large quantities, even small-sized electric appliances end up as huge amounts of waste material and present problems in terms of environmental preservation.

Shredding waste material is a popular processing method employed today. However, since shredding merely decreases the volume of waste material, and since the waste material, if buried underground, remains unchanged over several ten years or several hundred years, shredding does not bring any basic solution to this environmental problem. Even if the shredder dust were to be recycled, because it has been finely reduced, valuable material such as copper would become mixed with other less valuable material, for example, and its purity would be compromised, thereby lowering collection efficiency.

On the other hand, it could be inferred that using biodegradable polymers has the following two advantages. First, by manufacturing the casing and structure of an electronic appliance, both of which occupy the bulk of a product's volume, with biodegradable material, and by employing an easily separable structure such as, for example, screws or fitting (male-female) structures to assemble these parts with non-biodegradable parts, such as electronic components and substrates, parts to be recycled and parts which can be disposed of can be disassembled and processed individually with relative ease. Thus, improved collection efficiency could be expected.

Second, biodegradable material may be used for the external surfaces of the casings of products such as radios, microphones, portable televisions, keyboards, Walkmans, portable telephones, radio cassette recorders and earphones, for instance. By thus employing biodegradable material for portions of devices which frequently contact a user's body as described above, electrical appliances, which are safer than those employing synthetic resins for comparable portions, may be provided.

However, not every kind of biodegradable polymer is suitable for use in the manner described above, and in order to be suitable for use as a material for the casing or structure of an electrical appliance, certain physical properties are required. The present inventors found that it is at least required that no degradation of the physical properties take place even if held for 48 hours in an atmosphere of 80° C. in temperature and 80% humidity.

Biodegradable polymers are organic materials, which are degradable and assimilated into the environment by the action of nature or microorganisms, and which have been developed as ideal materials that meet environmental needs. Examples of such biodegradable polymers described above may include: polysaccharide derivatives such as, for instance, cellulose, starch, dextran, chitin and the like; peptides such as, for example, collagen, casein, fibrin, gelatin and the like; polyamino acids; polyvinyl alcohol; polyamides such as, for example, 4-nylon and 2-nylon/6-nylon copolymer; aliphatic polyesters; and so forth.

Aliphatic polyester resin, which is a typical example of a biodegradable polymer, generally has a low melting point and is inadequate in terms of its physical properties (particularly, heat resistance and shock resistance) to be fit for use in commercially viable moldings. Considerations such as adding inorganic fillers or crystal nucleic agents for improving the crystallization rate or blending with biodegradable resins showing rubber-like properties and having low glass transition points have been made. Several patent applications for such moldings using plastics described above have already been filed (Japanese Unexamined Patent Application Publications No. 3-290461, No. 4-146952, No. 4-325526 and the like). These moldings are used as films or packaging materials, and hence do not specifically require durability.

On the other hand, in applying biodegradable aliphatic resin to the casings of electrical appliances and electronic devices and the like, long-term reliability, in other words, durability under conditions of constant temperature and humidity, as well as heat resistance, are required. Although product life cycles vary between electric appliances and electronic devices, in small-sized audio products, it is necessary that their physical properties be maintained for 3 to 7 years under, for example, conditions of 30° C. and 80% relative humidity. Considering the fact that electric appliances and electronic devices are operated under widely varying temperatures and humidity conditions, since existing biodegradable polyesters have issues in terms of long-term reliability, as described above, they could not be used for casings of electric appliances, electronic devices and the like. Currently, biodegradable polymers, mainly aliphatic polyester resins, are beginning to be used as materials for use in agriculture, forestry and fishery (films, planters, fishing lines, fishing nets and the like), and materials for use in civil engineering (water-retentive sheets, plant nets, sandbags and the like), as well as in the fields of packaging and containerization (for those which are hard to recycle due to adhesion of soil and food thereto).

As described above, it is at least required of biodegradable polyester resins that no degradation of their physical properties take place for at least 48 hours under conditions of constant temperature and humidity (for instance, at 80° C. and 80% relative humidity) if they are to be used in casings of electric appliances, electronic devices and the like. Moldings of existing biodegradable polyesters, even in the case of polylactic acid, for example, which is most resistant to heat, when subjected to aging tests over 48 hours at a temperature of 80° C. and a relative humidity of 80%, a 60% decrease in molecular weight by the action of hydrolysis takes place (Refer to Comparative example 1 below), and thus using them as materials for casings of household electric appliances is difficult. As one of the factors accounting for such a degradation in physical properties, that is, the occurrence of hydrolysis, it is known, for example, in the case of polyester, that a carboxyl group at a polymer chain terminal catalytically causes hydrolysis of ester bonds in molecular chains.

SUMMARY OF THE INVENTION

The present invention sets forth a plastic material, which, in order to ensure long-term reliability, maintains its physical properties (such as strength, hydrolysis resistance and heat resistance, for example) while the products are in use by preventing active hydrogen in an active-hydrogenous functional group, such as carboxyl and hydroxyl groups, and the like, in biodegradable plastics from catalytically causing hydrolysis of main chains, and which, when disposed of, is hydrolyzed and is degraded by microorganisms generally found in nature.

It is an aspect of the present invention to provide a biodegradable plastic material capable of ensuring long-term reliability, biodegradable polyester material in particular, and, further, a molding using this biodegradable plastic material.

As a result of conducting thorough research to ensure long-term reliability of biodegradable polyesters for use as casing materials in electric appliances, electronic devices and the like, the present inventors have found that improvements in long-term reliability are attained by adding a compound reactive to active hydrogen contained in the biodegradable polyester to make this compound react with the active hydrogen so as to decrease the amount of active hydrogen, and specifically by thereby reducing the amount of residual fatty acids in the composition, in other words the acid value, below a predetermined amount. In addition, the present inventors have also found that the amount of active hydrogen may be reduced in biodegradable polymers having an amino group and/or an amide bond by treating them in a manner similar to biodegradable polyesters.

The term "active hydrogen" as used herein denotes compounds having a bond between oxygen, nitrogen or the like and hydrogen, this bond being higher in reactivity than a bond between carbon and hydrogen. Examples of such compounds include, for instance, carboxyl groups: —COOH, hydroxyl groups: —OH, amino groups: —NH$_2$, amide bonds: —NHCO—, and the like.

More specifically, the present inventors have found that a casing material having long-term reliability which does not suffer degradation in physical properties after an aging test, for example, over 48 hours at 80° C. and 80% humidity, by making compounds reactive to active hydrogen, such as carbodiimide compounds and polyisocyanate compounds, react with biodegradable plastic material in order to control the amount of, for example, fatty acids, that is, the acid value at or below a predetermined value. The present inventors conducted further studies, and completed the present invention.

In other words, the present invention relates to:
(1) a biodegradable plastic material treated with a compound reactive to the active hydrogen contained in biodegradable plastics;
(2) the biodegradable plastic material described above in (1), wherein the biodegradable plastic material includes a biodegradable polyester material;
(3) the biodegradable plastic material described above in (1), wherein the biodegradable plastic material includes (a) a copolymer of biodegradable polyester and biodegradable polymer having an amino group and/or an amide bond or (b) a mixture of biodegradable polyester and biodegradable polymer having an amino group and/or an amide bond;
(4) the biodegradable plastic material described above in (1), wherein the acid value of the biodegradable plastic material treated with a compound reactive to active hydrogen is 0.5 or less;
(5) the biodegradable plastic material described above in (1), wherein even after a 48-hour-aging process under a condition of constant temperature and humidity at 80° C. and 80% relative humidity, the rise in acid value is not more than 0.2, and the decrease in molecular weight is 10% or less;
(6) the biodegradable plastic material described above in (1), wherein the active hydrogen is attributable to at least one atomic group selected from carboxyl groups, hydroxyl groups, amino groups and amide bonds in the biodegradable plastic material;
(7) the biodegradable plastic material described above in (1), wherein the compound reactive to active hydrogen includes a bridging agent having a carbodiimide group;
(8) the biodegradable plastic material described above in (7), wherein the bridging agent having a carbodiimide group includes dicyclohexylcarbodiimide or diisopropylcarbodiimide;
(9) the biodegradable plastic material described above in (1), wherein the biodegradable plastic material contains a silicate;
(10) the biodegradable plastic material as described above in (9), wherein the silicon dioxide content of the silicate is 50% or more;
(11) the biodegradable plastic material described above in (9), wherein the silicate takes the form of particles having an average diameter of not more than 50 μm;
(12) a biodegradable plastic molding molded from a biodegradable plastic material treated with a compound reactive to the active hydrogen in biodegradable plastics;
(13) the biodegradable plastic molding described above in (12), wherein the biodegradable plastic material includes a biodegradable polyester material;
(14) the biodegradable plastic molding described above in (12), wherein the biodegradable plastic material includes (a) a copolymer of biodegradable polyester and biodegradable polymer having an amino group and/or an amide bond or (b) a mixture of biodegradable polyester and biodegradable polymer having an amino group and/or an amide bond;
(15) the biodegradable plastic molding described above in (12), wherein the biodegradable plastic molding includes a casing for an electric appliance;
(16) the biodegradable plastic molding described above in (12), wherein the acid value of the biodegradable plastic material treated with a compound reactive to active hydrogen is 0.5 or less;
(17) the biodegradable plastic molding described above in (12), wherein even after a 48-hour-aging process under a condition of constant temperature and humidity at 80° C. and 80% relative humidity, the rise in acid value is not more than 0.2, and the decrease in molecular weight is 10% or less;
(18) the biodegradable plastic molding described above in (12), wherein the active hydrogen is attributable to at least one atomic group selected from carboxyl groups, hydroxyl groups, amino groups and amide bonds in the biodegradable plastic material;

(19) the biodegradable plastic molding described above in (12), wherein the compound reactive to active hydrogen includes a bridging agent having a carbodiimide group;

(20) the biodegradable plastic molding described above in (19), wherein the bridging agent having a carbodiimide group includes dicyclohexylcarbodiimide or diisopropylcarbodiimide;

(21) the biodegradable plastic molding described above in (12), wherein the biodegradable plastic molding contains a silicate;

(22) the biodegradable plastic molding described above in (21), wherein the silicon dioxide content of the silicate is 50% or more;

(23) the biodegradable plastic molding described above in (21), wherein the silicate takes the form of particles having an average diameter of not more than 50 μm;

(24) a method of manufacturing a biodegradable plastic molding, wherein a compound reactive to active hydrogen is added to and mixed with a biodegradable plastic material before, while or after melting the biodegradable plastic material, and thereafter the biodegradable plastic material is molded;

(25) the method of manufacturing a biodegradable plastic molding described above in (24), wherein the molding step is performed by means of film molding, extrusion molding or injection molding;

(26) a method of manufacturing a biodegradable plastic molding, wherein a silicate and a compound reactive to active hydrogen are added to and mixed with a biodegradable plastic material simultaneously or individually before, while or after melting the biodegradable plastic material, and thereafter the biodegradable plastic material is molded;

(27) the method of manufacturing a biodegradable plastic molding described above in (26), wherein the molding step is performed by means of film molding, extrusion molding or injection molding;

(28) the method of manufacturing a biodegradable plastic molding described above in (26), wherein the silicon dioxide content of the silicate is 50% or more; and

(29) the method of manufacturing a biodegradable plastic molding described above in (26), wherein the silicate takes the form of particles having an average diameter of not more than 50 μm.

BRIEF DESCRIPTION OF THE DRAWINGS

The invention disclosed herein will become better understood as a detailed description is made of the preferred embodiments with reference to the appended drawings in which:

FIG. 2a is a diagram in which time (days) is plotted against temperature (° C.), wherein the rise in acid value was not more than 0.2 and the decrease in molecular weight was 10% or less in an example 6 described below;

FIG. 2b is a diagram in which the logarithm of time (log (days)) is plotted against the reciprocal of temperature (1/temperature: 1/K), wherein the rise in acid value was not more than 0.2 and the decrease in molecular weight was 10% or less in the example 6;

DETAILED DESCRIPTION OF THE PREFERRED EMBODIMENTS

Figure 1A:
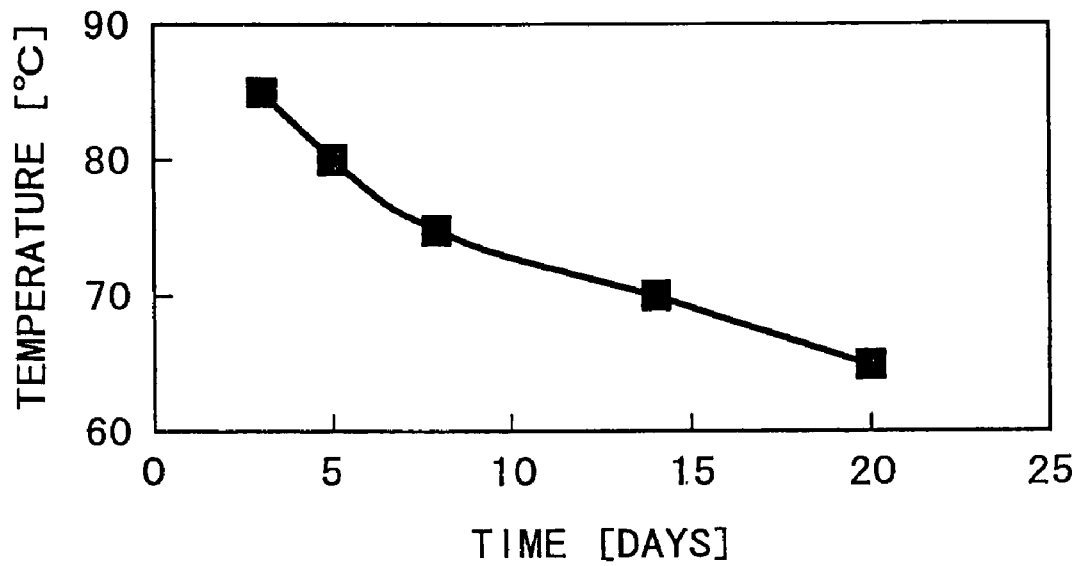
FIG. 1a is a diagram in which time (days) is plotted against temperature (° C.), wherein the rise in acid value was not more than 0.2 and the decrease in molecular weight was 10% or less in an example 5 described below.

The term "biodegradable plastics" as used herein denotes plastics which, once disposed of, are initially degraded into low-molecular weight compounds and eventually into water and carbon dioxide by the action of microorganisms found in nature (ISO/TC-207/SC3, Biodegradable Plastics Society).

Examples of biodegradable polymers which may be used as materials of such biodegradable plastics include, for instance, polysaccharide derivatives such as cellulose, starch, dextran and chitin; peptides such as collagen, casein, fibrin and gelatin; polyamino acids; polyvinyl alcohol; polyamides such as nylon 4 and nylon 2/nylon 6 copolymer; and polyesters such as polyglycollic acid, polylactic acid, polysuccinic acid ester, polyoxalic ester, polyhydroxybutyric acid, polydiglycollic acid butylene, polycaprolactone, polydioxanone, and the like. Thus, a wide variety of biodegradable polymers are available and may also be used herein. That is, the biodegradable polymer may be any kind of material as long as it is an organic material which degrades and is assimilated by the action of nature and microorganisms; it is a material which may be considered an ideal match for the environment and may include any material within the aspects of the present invention described herein. Of these examples, biodegradable polyester is particularly preferable.

As long as they lie within the aspects of the present invention, the biodegradable plastics employed herein may include biodegradable polyesters, copolymers of biodegradable polyester and biodegradable polymer having an amino group and/or an amide bond, or a mixture of biodegradable polyester and biodegradable polymer having an amino group and/or an amide bond. Examples of biodegradable polymers having an amino group and/or an amide bond include, for instance, biodegradable polyamides such as nylon and polyamino acid and the like.

Biodegradable polyesters employed for the present invention include polymers having an ester bond such as —CO—O—, in their main chains, and examples of the biodegradable polyesters used herein include polyesters metabolized by the action of microorganisms of such polyesters, aliphatic polyester resins having formability, heat resistance and shock resistance are preferable.

Examples of the aliphatic polyester resins mentioned above include hydroxycarboxylic acid-type aliphatic polyester resins, such as polyoxalic ester, polysuccinic acid ester, polyhydroxybutyric acid, polydiglycollic acid butylene, polycaprolactone, polydioxanone, and polymers of hydroxy acids such as lactic acid, malic acid and glycolic acid, or copolymers of these polymers. Hydroxycarboxylic acid-type aliphatic polyester resins, such as polylactic acids, are preferable.

The biodegradable polyesters employed for the present invention may be synthesized through various kinds of processes including, for instance, (1) the lactide process, (2) polycondensation of polyhydric alcohol and polybasic acid, (3) intermolecular polycondensation of hydroxycarboxylic acid having both a hydroxyl group and a carboxyl group in the molecules thereof, and the like.

The lactide process is a process based on ring-opening polymerization of cyclic diester and lactones corresponding to the cyclic diester. Examples of such cyclic diesters include, for instance, lactide, glycolide and the like; and examples of such lactones include, for instance, ε-caprolactone, β-propiolactone, γ-butyrolactone, δ-valerolactone and the like.

Examples of polyhydric alcohols which may be used for the polycondensation of polyhydric alcohol and polybasic acid include, for instance, ethylene glycol; diethylene glycol; triethylene glycol; propylene glycol; neopentyl glycol; 1,3-butanediol; 1,4-butanediol; 1,6-hexanediol and the like. In addition, examples of polybasic acids which may be used for the polycondensation typically include, for instance, aromatic dicarboxylic acids, such as terephthalic acid, isophthalic acid, orthophthalic acid and naphthalene dicarboxylic acid; aliphatic dicarboxylic acids, such as adipic acid, sebacic acid, oxalic acid, succinic acid, succinic anhydride, maleic acid, maleic anhydride, fumaric acid and dimer acid; and alicyclic dicarboxylic acids, such as 1,4-cyclohexane dicarboxylic acid. However, since aliphatic polyesters are better suited for the present invention, it is preferable that the polyhydric alcohol and the polybasic acid, which are materials for the biodegradable polyester, be aliphatic compounds.

In addition, the intermolecular polycondensation of the hydroxycarboxylic acid having a hydroxyl group and a carboxyl group in its molecules may be obtained through a process of contact dehydration condensation of the corresponding hydroxycarboxylic acid. Examples of such hydroxycarboxylic acids include, for instance, aliphatic hydroxycarboxylic acids such as lactic acid, 2-hydroxyacetic acid, 2-hydroxypropanoic acid, 2-hydroxybutyric acid, 2-hydroxyvaleric acid, 2-hydroxyhexanoic acid, 2-hydroxyheptanoic acid, 2-hydroxyoctanoic acid, 2-hydroxy-2-methylpropanoic acid, 2-hydroxy-2-methylbutyric acid, 2-hydroxy-2-ethylbutyric acid, 2-hydroxy-2-methylvaleric acid, 2-hydroxy-2-ethylvaleric acid, 2-hydroxy-2-propylvaleric acid, 2-hydroxy-2-butylvaleric acid, 2-hydroxy-2-methylhexanoic acid, 2-hydroxy-2-ethylhexanoic acid, 2-hydroxy-2-propylhexanoic acid, 2-hydroxy-2-butylhexanoic acid, 2-hydroxy-2-pentylhexanoic acid, 2-hydroxy-2-methylheptanoic acid, 2-hydroxy-2-ethylheptanoic acid, 2-hydroxy-2-propylheptanoic acid, 2-hydroxy-2-butylheptanoic acid, 2-hydroxy-2-pentylheptanoic acid, 2-hydroxy-2-hexylheptanoic acid, 2-hydroxy-2-methyloctanoic acid, 2-hydroxy-2-ethyloctanoic acid, 2-hydroxy-2-propyloctanoic acid, 2-hydroxy-2-butyloctanoic acid, 2-hydroxy-2-pentyloctanoic acid, 2-hydroxy-2-hexyloctanoic acid, 2-hydroxy-2-heptyloctanoic acid, 3-hydroxypropanoic acid, 3-hydroxybutanoic acid, 3-hydroxypentanoic acid, 3-hydroxyhexanoic acid, 3-hydroxyheptanoic acid, 3-hydroxyoctanoic acid, 3-hydroxy-3-methylbutanoic acid, 3-hydroxy-3-methylpentanoic acid, 3-hydroxy-3-ethylpentanoic acid, 3-hydroxy-3-methylhexanoic acid, 3-hydroxy-3-ethylhexanoic acid, 3-hydroxy-3-propylhexanoic acid, 3-hydroxy-3-methylheptanoic acid, 3-hydroxy-3-ethylheptanoic acid, 3-hydroxy-3-propylheptanoic acid, 3-hydroxy-3-butylheptanoic acid, 3-hydroxy-3-methyloctanoic acid, 3-hydroxy-3-ethyloctanoic acid, 3-hydroxy-3-propyloctanoic acid, 3-hydroxy-3-butyloctanoic acid, 3-hydroxy-3-pentyloctanoic acid, 4-hydroxybutanoic acid, 4-hydroxypentanoic acid, 4-hydroxyhexanoic acid, 4-hydroxyheptanoic acid, 4-hydroxyoctanoic acid, 4-hydroxy-4-methylpentanoic acid, 4-hydroxy-4-methylhexanoic acid, 4-hydroxy-4-ethylhexanoic acid, 4-hydroxy-4-methylheptanoic acid, 4-hydroxy-4-ethylheptanoic acid, 4-hydroxy-4-propylheptanoic acid, 4-hydroxy-4-methyloctanoic acid, 4-hydroxy-4-ethyloctanoic acid, 4-hydroxy-4-propyloctanoic acid, 4-hydroxy-4-butyloctanoic acid, 5-hydroxypentanoic acid, 5-hydroxyhexanoic acid, 5-hydroxyheptanoic acid, 5-hydroxyoctanoic acid, 5-hydroxy-5-methylhexanoic acid, 5-hydroxy-5-methylheptanoic acid, 5-hydroxy-5-ethylheptanoic acid, 5-hydroxy-5-methyloctanoic acid, 5-hydroxy-5-ethyloctanoic acid, 5-hydroxy-5-propyloctaonic acid, 6-hydroxyhexanoic acid, 6-hydroxyheptanoic acid, 6-hydroxyoctanoic acid, 6-hydroxy-6-methylheptanoic acid, 6-hydroxy-6-methyloctanoic acid, 6-hydroxy-6-ethyloctanoic acid, 7-hydroxyheptanoic acid, 7-hydroxyoctanoic acid, 7-hydroxy-7-methyloctanoic acid, 8-hydroxyoctanoic acid and the like, as well as oligomers which may be derived therefrom.

Examples of catalysts which may be used to prepare the hydroxycarboxylic acid-type aliphatic polyester resins include tin compounds, antimony compounds, zinc compounds, titanium compounds, iron compounds and aluminum compounds. Of these, tin and aluminum type catalysts are preferred, and, further, tin octylic acid and aluminum acetylacetonato are particularly preferable.

Of the hydroxycarboxylic acid-type aliphatic polyester resins above, poly-L-lactic acid prepared through lactide ring-opening condensation is particularly preferable, since it is hydrolyzed into L-lactic acid, and since its safety is confirmed. However, it is to be understood that the hydroxycarboxylic acid-type aliphatic polyester resins used herein are not limited thereto, and, therefore, the lactide used in the manufacture thereof is not limited to L-forms either.

For the compounds reactive to active hydrogen according to the present invention, for instance, compounds such as carbodiimide compounds, isocyanate compounds or oxazoline compounds may be employed, all of which show reactivity to the hydrogen in the hydroxyl group and the carboxyl group, which are terminal functional groups of polyester resins, or the hydrogen in the amino group and/or amide bond of the biodegradable polymer, which are contained as copolymers or mixtures. Carbodiimide compounds are particularly suitable, because they melt and blend with polyesters, and because hydrolyzation can be regulated by a small amount of addition thereof. Also, these compounds are reactive to active hydrogen and may be used individually or in combinations of two or more.

The carbodiimide compounds include bridging agents having a carbodiimide group and compounds (including polycarbodiimide compounds) having one or more carbodiimide bonds, such as —N=C=N—, in their molecules. A method of preparation thereof includes those processes in which, for instance, various kinds of polyisocyanates are subjected to a decarboxylation condensation reaction at a temperature of about 70° C. or above without a solvent or in an inert solvent (such as hexane, benzene, dioxane and chloroform) using, as the catalyst, organic phosphorus compounds (such as O,O-dimethyl-O-(3-methyl-4-nitrophenyl)phosphorothioate, O,O-diethyl-O-(3-methyl-4-(methylthio)phenyl)phosphorothioate and O,O-diethyl-O-2-isopropyl-6-methylpyrimidine-4-isophosphorothioate) or organic metallic compounds (such as rhodium complex, titanium complex, tungsten complex and palladium complex, and the like).

Examples of monocarbodiimide compounds contained in the carbodiimide compound above include dicyclohexylcarbodiimide; diisopropylcarbodiimide; dimethylcarbodiimide;

diisobutylcarbodiimide; dioctylcarbodiimide; t-butylisopropylcarbodiimide; diphenylcarbodiimide; di-t-butylcarbodiimide; di-β-naphthylcarbodiimide and the like. Of the examples above, dicyclohexylcarbodiimide or diisopropylcarbodiimide are particularly preferable because of their industrial availability.

Examples of polyisocyanate compounds include, for instance, 2,4-tolylenediisocyanate; 2,6-tolylenediisocyanate; m-phenylenediisocyanate; p-phenylenediisocyanate; 4,4'-diphenylmethanediisocyanate; 2,4'-diphenylmethanediisocyanate; 2,2'-diphenylmethanediisocyanate; 3,3'-dimethyl-4,4'-biphenylenediisocyanate; 3,3'-dimethoxy-4,4'-biphenylenediisocyanate; 3,3'-dichloro-4,4'-biphenylenediisocyanate; 1,5-naphthalenediisocyanate; 1,5-tetrahydronaphthalenediisocyanate; tetramethylenediisocyanate; 1,6-hexamethylenediisocyanate; dodecamethylenediisocyanate; trimethylhexamethylene diisocyanate; 1,3-cyclohexylenediisocyanate; 1,4-cyclo hexylenediisocyanate; xylylenediisocyanate; tetramethyl xylylenediisocyanate; hydrogenated xylylenediisocyanate; lysinediisocyanate; isophoronediisocyanate; 4,4'-dicyclohexylmethanediisocyanate; 3,3'-dimethyl-4,4'-dicyclohexylmethanediisocyanate and the like. Commercially available polyisocyanate compounds are used in examples, as will be described later, according to the present invention, and aromatic isocyanate adducts, such as Coronate (produced by Nippon Polyurethane Industry Co., Ltd.: hydrogenated diphenylmethanediisocyanate) or Millionate (produced by Nippon Polyurethane Industry Co., Ltd.), may be used. However, in the case of melt blending, solid polyisocyanate compounds, such as those in which an isocyanate group is blocked with a masking agent (such as polyhydric aliphatic alcohol and aromatic polyol, or the like), are preferred to liquid polyisocyanate compounds.

Examples of oxazoline compounds include, for instance, 2,2'-o-phenylenebis(2-oxazoline); 2,2'-m-phenylenebis(2-oxazoline); 2,2'-p-phenylenebis(2-oxazoline); 2,2'-p-phenylenenbis(4-methyl-2-oxazoline); 2,2'-m-phenylenebis(4-methyl-2-oxazoline); 2,2'-p-phenylenebis(4,4'-dimethyl-2-oxazoline); 2,2'-m-phenylenebis(4,4'-dimethyl-2-oxazoline); 2,2'-ethylenebis (2-oxazoline); 2,2'-tetramethylenebis(2-oxazoline); 2,2'-hexamethylenebis(2-oxazoline); 2,2'-octamethylenebis (2-oxazoline); 2,2'-ethylenebis(4-methyl-2-oxazoline); 2,2'-diphenylenebis(2-oxazoline) and the like.

In treating biodegradable plastics with compounds that are reactive to the active hydrogen in biodegradable plastics, the compounds that are reactive to active hydrogen are normally added to the biodegradable plastics before, while or after melting the biodegradable plastics, and they are then blended together. It is preferred that the amount of compounds that are reactive to active hydrogen to be added be about 0.1 to 5 weight % of the biodegradable plastic. However, since the long-term reliability and the speed of degradation after disposal of the biodegradable plastic material of the present invention that is treated with a compound which is reactive to active hydrogen may be adjusted by varying the kind and amount of the compound to be added mentioned above, the kind and amount of compound to be added may be determined according to the final product to which the biodegradable plastic material is to be applied. In addition, the compound that is reactive to active hydrogen may be used individually or in combinations of two or more compounds.

As described above, the biodegradable plastic and the compound reactive to active hydrogen may be blended before, while or after melting the biodegradable plastic. That is, blending may be performed at anytime as long as the biodegradable plastic melts and sufficiently blends with the compound reactive to active hydrogen.

A method of determining the quantity of active hydrogen contained in the biodegradable plastic treated with the compound reactive to active hydrogen includes, for instance, measuring the amount of residual fatty acids, that is, the acid value. In the present invention, biodegradable polyester is a main material, and in the biodegradable polyester there exist carboxyl groups and hydroxyl groups. Measuring the acid value is equivalent to determining the amount of carboxyl groups in the biodegradable polyester and is, hence, practically equivalent to determining the amount of active hydrogen. The term "acid value" denotes the amount of potassium hydroxide, in milligrams, required to neutralize the free fatty acid contained in 1 g of fat, such as fatty acids. A description of one preferred embodiment of how to measure the acid value will now be given.

As reagents for measuring the acid value, a 0.02N KOH-EtOH solution (KOH represents potassium hydroxide, and EtOH represents ethanol. The same shall apply hereinafter), a phenolphthalein solution and a phenol red solution are used. Methods of preparing each solution are described below.

One preferred method of preparing the 0.02N KOH-EtOH solution is as follows. Dissolve approximately 0.35 g of potassium hydroxide (KOH) in 5 ml of ion exchange water, add EtOH to such that there is now 250 ml of the solution, then place the solution in a container tightly sealed with a glass or rubber stopper, and allow the solution to stand for 24 hours. A clear supernatant liquid thus prepared is immediately decanted into a different light-shielded container, which is then tightly sealed with a rubber stopper and stored. Then, standardization of this regent is conducted using a 0.02N hydrochloric acid. Exactly 5 ml of the 0.02N hydrochloric acid is measured, 10 ml of ion exchange water is added thereto, and to this mixture are added, for instance, two drops of phenolphthalein reagent as an indicator. The prepared 0.02N KOH-EtOH solution is titrated therewith until it turns light red, and the factor then is calculated.

One preferred method of preparing the phenolphthalein solution includes dissolving 0.025 g of phenolphthalein in 22.5 ml of EtOH (95%) and adding ion exchange water to obtain 25 mL of the solution. This reagent is colorless at a pH of 8.3 and below, and it turns red at a pH of 8.3 to 10.0.

One preferred method of preparing the phenol red solution includes dissolving 0.025 g of phenol red in 5 ml of EtOH (95%) and adding ion exchange water to obtain 25 mL of the solution. This reagent assumes a yellow color at a pH of 6.8 or below, and it turns red at a pH of 8.4 or above.

One preferred embodiment of measuring the acid value using the prepared reagent includes the following. Exactly 0.1 mg of, for example, polylactic acid as a biodegradable polyester material is weighed and is dissolved in 10 ml of chloroform, and 10 ml of benzyl alcohol is added thereto. Phenol red is used as an indicator, and the end point is set to be the point where the 0.02N KOH-EtOH solution changes from yellow to light red. The volume thereof is expressed as Vml.

Similarly, measurements are taken with a blank solution of 10 ml of benzyl alcohol+10 ml of chloroform. The volume thereof is expressed as $V_0$ ml.

The weight (mg) of KOH required to neutralize the free fatty acid contained per gram of a sample may be calculated with the following equation.

$$AV(\text{acid value}) = \{(V - V_0) \times 0.02 \times F \times 56.11\}/S$$

F in the equation above represents the factor of the 0.02N KOH-EtOH solution, V is the volume (ml) of the 0.02N KOH-EtOH solution used in titrating the sample, $V_0$ is the volume (ml) of the 0.02N KOH-EtOH solution used in titrating the blank solution, and S is the weight (g)· of the sample.

In addition, an alternative method of determining the amount of active hydrogen contained in the biodegradable plastic prepared by treatment with a compound reactive to active hydrogen includes allowing the active hydrogen to react with Grignard reagents. Because this process, unlike the previous process, can measure not only the amount of carboxyl groups, but also the amount of hydroxyl groups, amino groups and the like, it may also be applied to copolymers or mixtures of polyester and polyamide. Active hydrogen generates methane gas in a quantitative reaction to methylmagnesium iodide. By having this reaction take place in a reaction container of an apparatus for determining the amount of active hydrogen, and by collecting the generated methane gas in a gas buret and measuring the volume thereof, the amount of active hydrogen can be determined. Examples of Grignard reagents include, for instance, phenylmagnesium bromide, ethylmagnesium chloride, propylmagnesium chloride, butylmagnesium chloride and the like, in addition to methylmagnesium iodide, mentioned above.

It is preferred that the acid value of the biodegradable plastic material prepared through treatment with a compound reactive to active hydrogen be about 0.5 or less prior to the aging process. When the acid value is about 0.5 or less, hydrolysis of the biodegradable plastic by the action of the active hydrogen is less likely to occur, and thus a biodegradable plastic material which can stand 48-hours of aging under a condition of constant temperature and humidity at 80° C. and 80%, respectively, may be obtained.

It is preferable that the rise in acid value in the biodegradable plastic material prepared through treatment with a compound reactive to active hydrogen after aging be about 0.2 or less. It is also preferable that the decrease in molecular weight thereof be 10% or less. So long as the rise in acid value and the decrease in molecular weight are held within their respective ranges, long-term reliability of the biodegradable plastic material when used as a material for the casings of electric appliances may be ensured.

The biodegradable plastic material according to the present invention may simultaneously use reinforcements, inorganic or organic fillers, antioxidants, thermal stabilizers and ultraviolet absorbers, as well as lubricants, waxes, colorants, crystallization promoters and degradable organic matters, such as starch, as long as the acid value prior to aging does not exceed 0.5. In addition, they may be used individually or in combination.

Examples of the reinforcements mentioned above include, for instance, glass micro-beads, carbon fibers, chalk, silicates such as asbestos, feldspars, micas, talc, wollastonite, and quartz including novoculite, kaolin and the like. Examples of the inorganic fillers mentioned above include, in addition to carbon and silicon dioxide, for instance, fine particles of metal oxides such as alumina, silica, magnesia and ferrite, silicates such as talc, micas, kaolin, zeolite and the like, fine particles of barium sulfate, calcium carbonate, fullerene and the like. Examples of the organic fillers mentioned above include, for instance, epoxy resins, melamine resins, urea resins, acrylic resins, phenolic resins, polyimide resins, polyamide resins, polyester resins, Teflon (registered trademark) and the like. Of these, carbon and silicon dioxide are preferable. The above fillers may also be used individually or as a mixture of two or more fillers. The silicates, as inorganic fillers, also function as flame retardants. To be suitable as inorganic fillers, silicates having a silicon dioxide content of approximately 50% or above are preferable. This is because the silicates are extracted from natural minerals, and a certain amount of matters other than silicates (for instance, MgO, CaO, $Fe_2O_3$ and $Al_2O_3$ or the like) are inevitably found. It is to be understood that it is preferable that the effectiveness of the inorganic fillers as flame retardants not be inhibited by impurities.

In the present invention, the additives described above are not limited to any specific shape or form, but it is preferable that they take the form of particles. The diameter thereof may be selected according to the specific kind of additive. For example, in using silicates as the inorganic filler, it is preferable that the average diameter of the particles thereof obtained by laser diffraction be about 50 μm or less. In this case, the distribution of diameter is of little importance.

Examples of the antioxidants mentioned above include, for instance, phenolic antioxidants, amine antioxidants, phosphoric antioxidants, sulfuric antioxidants, hydroquinone antioxidants, quinoline antioxidants and the like. Examples of the phenolic antioxidants include: hindered phenols, for instance, $C_{2-10}$ alkylenediol-bis[3-(3,5-di-branched $C_{3-6}$ alkyl-4-hydroxyphenyl)propionate], such as 2,6-di-t-butyl-p-cresol, 1,3,5-trimethyl-2,4,6-tris (3,5-di-t-butyl-4-hydroxybenzyl)benzene, 2,2'-methylenebis(4-methyl-6-t-butylphenol), 4-4,4'-methylenebis (2,6-di-t-butylphenol), 4,4'-butylidenebis(3-methyl-6-t -butylphenol) and 1,6-hexanediol-bis[3-(3,5-di-t-butyl-4-hydroxyphenyl) propionate], and the like; di or trioxy$C_{2-4}$ alkylenediol-bis[3-(3,5-di-branched $C_{3-6}$ alkyl-4-hydroxyphenyl)propionate], such as triethyleneglycol-bis[3-(3-t-butyl-5-methyl-4-hydroxyphenyl)propionate] and the like; $C_{3-8}$ alkanetriol-bis[3-(3,5-di-branched $C_{3-6}$ alkyl-4-hydroxyphenyl)propionate], such as glycerol tris[3-(3,5-di-t-butyl-4-hydroxyphenyl)propionate] and the like; $C_{4-8}$ alkanetetraoltetrakis[3-(3,5-di-branched $C_{3-6}$ alkyl-4-hydroxyphenyl)propionate] such as pentaerythritoltetrakis[3-(3,5-di-t-butyl-4-hydroxyphenyl) propionate] and the like; n-octadecyl-3-(4',5'-di-t-butylphenol) propionate; n-octadecyl-3-(4'-hydroxy-3',5'-di-t-butylphenol)propionate stearyl-2-(3,5-di-t-butyl-4-hydroxyphenol) propionate; distearyl-3,5-di-t-butyl-4-hydroxybenzylphosphonate; 2-t-butyl-6-(3-t-butyl-5-methyl-2-hydroxybenzyl)-4-methyl phenylacrylate; N,N'-hexamethylenebis(3,5-di-t-butyl-4-hydroxy-hydrocinnamide); 3,9-bis{2-[3-(3-t-butyl-4-hydroxy-5-methylphenyl)propionyloxy]-1,1-dimethylethyl}-2,4,8,10-tetraoxaspiro[5,5]undecane; 4,4'-thiobis (3-methyl-6-t-butylphenol); 1,1,3-tris(2-methyl-4-hydroxy-5-t-butylphenol)butane and the like. Examples of the amine antioxidants mentioned above include, for instance, phenyl-1-naphthylamine; phenyl-2-naphthylamine; N,N'-diphenyl-1,4-phenylenediamine; N-phenyl-N'-cyclohexyl-1,4-phenylenediamine and the like. Examples of the phosphoric antioxidants include, for instance, phosphite compounds, such as triisodecylphosphite, triphenylphosphite, trisnonylphenylphosphite, diphenylisodecylphosphite, phenyldiisodecylphosphite, 2,2-methylenebis(4,6-di-t-butylphenyl)octylphosphite, 4,4'-butylidenebis(3-methyl-6-t-butylphenyl)ditridecylphosphite, tris(2,4-di-t-butylphenyl) phosphite, tris(2-t-butyl-4-methylphenyl)phosphite, tris(2,4-di-t-amylphenyl)phosphite, tris(2-t-butylphenyl)phosphite, bis (2-t-butylphenyl)phenylphosphite, tris [2-(1,1-dimethylpropyl)-phenyl]phosphite, tris[2,4-(1,1-dimethylpropyl)-phenyl]phosphite, tris (2-cyclohexylphenyl)phosphite, tris (2-t-butyl-4-phenylphenyl)phosphite, and the like, phosphine compounds such as triethylphosphine, tripropylphosphine, tributylphosphine, tricyclohexylphosphine, diphenylvinylphosphine, allyldiphenylphosphine, triphenylphosphine, methylphenyl-p-anisylphosphine, p-anisyldiphenylphosphine, p-tolyldiphenylphosphine, di-p-anisylphenylphosphine, di-p-tolylphenylphosphine, tri-m-aminophenylphosphine, tri-2,4-dimethylphenylphosphine, tri-2,4,6-trimethylphenyl phosphine, tri-o-tolylphosphine, tri-m-tolylphosphine, tri-p-tolylphosphine, tri-o-anisylphosphine, tri-p-anisylphosphine, 1,4-bis(diphenylphosphino) butane and the like. Examples of the hydroquinone antioxidants mentioned above include, for instance, 2,5-di-t-butylhydroquinone and the like. Examples of the quinoline antioxidants mentioned above include, for instance, 6-ethoxy-2,2,4-trimethyl-1,2-dihydroquinoline and the like; and examples of the sulfuric antioxidants mentioned above include, for instance, dilauryl thiodipropionate; distearyl thiodipropionate and the like. Of the examples above, preferable antioxidants include the phenolic antioxidants (particularly, the hindered phenols), for instance, polyol-poly [(branched $C_{3-6}$ alkyl group and hydroxyl group substituted phenyl)propionate] or the like. In addition, the antioxidants may be used individually or in combinations of two or more antioxidants.

Examples of the thermal stabilizers mentioned above include, for instance, nitrogenous compounds (for example, basic nitrogenous compounds such as polyamide, poly-β-alanine copolymers, polyacrylamide, polyurethane, melamine, cyanoguanidine and melamine-formaldehyde condensates), alkalies or alkaline earth metallic compounds (more specifically, organic carboxylic acid metallic salts (such as calcium stearate, 1 2-calcium hydroxystearate, and the like)), metal oxides (such as magnesium oxide, calcium oxide, aluminum oxide and the like), metal hydroxides (such as magnesium hydroxide, calcium hydroxide, aluminum hydroxide and the like), metal carbonates and on the like], zeolite, hydrotalcite and the like. Particularly, of the examples above, alkalies or alkaline earth metallic compounds (specifically, the alkaline earth metallic compounds such as magnesium compounds and calcium compounds, and the like), zeolite and hydrotalcite are preferred. In addition, the thermal stabilizers may be used individually or in combinations of two or more kinds.

The ultraviolet absorbers mentioned above include those of a benzophenone type, a benzotriazole type, a cyanoacrylate type, a salicylate type, an anilide oxalate type and the like. For instance, the ultraviolet absorbers include:
[2-hydroxy-4-(methacryloyl-oxyethoxy)benzophenone]-methyl methacrylate copolymers;
[2-hydroxy-4-(methacryloyloxymethoxy)benzophenone]-methyl methacrylate copolymers; [2-hydroxy-4-(methacryloyl-oxyoctoxy)benzophenone]-methyl methacrylate copolymers;
[2-hydroxy-4-(methacryloyloxydodecyloxy)benzophenone]-methyl methacrylate copolymers;
[2-hydroxy-4-(methacryloyl-oxybenziloxy)benzophenone]-methyl methacrylate copolymers;
[2,2'-dihydroxy-4-(methacryloyloxyethoxy)benzophenone]-methyl methacrylate copolymers; [2,2'-dihydroxy-4-(methacryloyloxymethoxy)benzophenone]-methyl methacrylate copolymers; [2,2'-dihydroxy-4-(methacryloyloxyoctoxy)benzophenone]-methyl methacrylate copolymers; and the like. In addition, the ultraviolet absorbers may be used individually or in combinations of two or more kinds.

Examples of the lubricants mentioned above include, for instance: petroleum lubricants, such as liquid paraffin and the like; synthetic lubricants, such as hydrocarbon halide, diester oil, silicone oil and fluorine silicone; various kinds of modified silicone oils such as epoxy-modified, amino-modified, alkyl-modified and polyether-modified silicone oils and the like; silicone lubricating matters, such as copolymers of an organic compound, such as polyoxy-alkyleneglycol and silicone, and the like; silicone copolymers; various kinds of fluoric surfactants, such as fluoroalkyl compounds and the like; fluoric lubricating matters, such as trifluoromethylenechloride low-grade polymers and the like; waxes, such as paraffin wax and polyethylene wax and the like; higher aliphatic alcohol; higher aliphatic amides; higher fatty acid esters; higher fatty acid salts; molybdenum disulfides; and the like. Of these, the use of silicone copolymers (copolymers in which silicone is block or graft copolymerized with resin) is particularly preferable. These silicone copolymers include any copolymer in which silicone is copolymerized with acrylic resin, polystyrene resin, polynitryl resin, polyamide resin, polyolefin resin, epoxy resin, polybutyral resin, melamine resin, vinyl chloride resin, polyurethane resin, polyvinyl ether resin or the like. It is preferred that silicone graft copolymers be used. These lubricating matters may be used individually or in combinations of two or more kinds.

Examples of the waxes mentioned above include, for instance: paraffin waxes and olefin waxes, such as polypropylene wax and polyethylene wax; Fischer-Tropsch waxes; micro-crystalline waxes; montan waxes; fatty acid amide waxes; higher aliphatic alcohol waxes; higher fatty acid waxes; fatty acid ester waxes; carnauba waxes; rice waxes; and the like. These waxes may be used individually or in combinations of two or more waxes.

Examples of the colorants mentioned above include inorganic pigments, organic pigments, dyes and the like. Examples of organic pigments include, for instance: chromic pigments, cadmium pigments, iron pigments, cobalt pigments, ultramarine, Prussian blue and the like. In addition, examples of organic pigments and dyes include, for instance: carbon black; phthalocyanine pigments, such as copper phthalocyanine; quinacridone pigments, such as quinacridone magenta and quinacridone red; azo pigments, such as hansa yellow, disazo yellow, permanent yellow, permanent red and naphthol red; nigrosine dyes such as spirit black SB, nigrosine base and oil black BW; oil blue; alkali blue and the like. These colorants may be used individually or in combinations of two or more colorants.

Examples of the crystallization promoters mentioned above include, for instance: organic acid salts, such as p-t-butylic sodium benzoate, sodium montanate, calcium montanate, sodium palmitate, calcium stearate and the like; inorganic salts, such as calcium carbonate, calcium silicate, magnesium silicate, calcium sulfate, barium sulfate, talc and the like; and metal oxides, such as zinc oxide, magnesium oxide and titanium oxide and the like. These crystallization promoters may be used individually or in combinations of two or more promoters.

A biodegradable plastic molding may be obtained by molding the biodegradable plastic material as used herein. The biodegradable plastic molding thus obtained may be used for casings of electric appliances such as radios, microphones, televisions, keyboards, portable audio players and personal computers and the like, for instance.

The biodegradable plastic material of the present invention may be used as a material for manufacturing, for example, casings of electric appliances, according to known methods of manufacture. Depending on the kind of product to be molded, a suitable means may be selected from publicly known means for molding. Examples of molding methods include, for instance, film molding, extrusion molding, injection molding and the like. Injection molding is particularly preferable. Extrusion molding or injection molding may be performed in accordance with typical methods using publicly known extruders such as uniaxial extruders, multiaxial extruders and tandem extruders, or publicly known injection molding machines, such as inline screw-type injection molding machines, multilayer injection molding machines and double headed injection molding machines, thereby molding the biodegradable plastic material into the desired shape.

One preferred method of molding is as follows. Mix the biodegradable plastic with a compound reactive to active hydrogen in a Henshell mixer of approximately 20 L at about 500 rpm for roughly two minutes. Then melt and blend this mixture with a biaxial extruder, which is adjusted to approximately 220° C. to prepare a pellet. This pellet is used to manufacture, for instance, casings of electric appliances in accordance with common procedures.

EXAMPLES

Examples using a biodegradable polyester according to the present invention will now be described below. However, it is to be understood that the present invention is not limited to these examples.

In addition, the molecular weight in the examples is the weight average molecular weight (polystyrene reduced molecular weight), and it was measured by Gel permeation chromatography (GPC).

Apparatus: MILLPORE Waters600E system controller

Sensors: UV (Waters484) and RI (Waters410)

Standard sample: Polystyrene

A test sample in chloroform was dissolved such that the concentration of the chloroform became 0.15 weight %, and the solution was stirred for approximately two hours and thereafter filtrated with a $\Phi 0.25$ μm filter to prepare the sample.

Example 1

To polylactic acid (brand name: LACEA H100J, product of Mitsui Chemicals, Inc.) was added 1 weight % of carbodiimide (brand name: carbodilite 10B, product of Nisshinbo Industries, Inc.) as a compound reactive to active hydrogen, and the mixture was blended at a temperature of 185° C. for five minutes. The acid value fell from 1.8 to 0.1. The blended substance was molded into the shape of a square plate with sides measuring five centimeters each and a thickness of 1 mm, and it was then subjected to aging for 48 hours under a condition of 80° C. in temperature and 80% in humidity. The rise in acid value was 0.2 or less, and the decrease in molecular weight was 10% or less.

Example 2

A sample piece was prepared in a manner similar to that of example 1, except that the amount of carbodiimide added was changed to 0.5 or 0.8 weight %, and the mixture was then blended. Upon the addition of 0.5 weight % or 0.8 weight % of carbodiimide, the acid value was 0.8 or 0.5, respectively. After being subjected to aging for 48 hours under a condition of 80° C. in temperature and 80% in humidity, the rise in acid value of the test sample to which 0.8 weight % of carbodiimide was added was 0.2 or less and the decrease in molecular weight was 10% or less. On the other hand, with the test sample to which 0.5 weight % of carbodiimide was added, the acid value increased from 0.8 to 5.2 in acid value and the molecular weight decreased by 60%.

Example 3

To each of polycaprolactone (brand name: Cellgreen, Grade: PH, product of Daicel Chemical Industries, Ltd.) and polybutylene succinate (brand name: Bionolle #1000, product of Showa Highpolymer Co., Ltd.) was added 1 weight % of carbodiimide (brand name: Carbodilite 10B, product of Nisshinbo Industries, Inc.) to prepare test samples in a manner similar to that of the previously described example 1. The acid values of these test samples were respectively 0.4 and 0.2. Aging of these test samples was performed over 48 hours at 80° C. and 80% humidity, wherein the rise in acid value and the decrease in molecular weight were 0.2 or less and 10% or less, respectively, for both samples.

Example 4

Instead of carbodiimide, 1 weight % of block-type polyurethane (brand name: of Millionate MS50, amount of isocyanate group: 15%, product of Nippon Polyurethane Industry Co., Ltd.) was added to polylactic acid to prepare a test sample in a manner similar to that of the previously described example 1. The acid value fell to 0.2. Aging of this test sample was performed at 80° C. and at 80% humidity over 48 hours, and the rise in acid value was 0.2 or less, while the decrease in molecular weight was 10% or less.

Example 5

The test sample in the previously described example 1 was subjected to aging at a constant humidity of 80% and variable temperatures of 85, 80, 75, 70 and 65° C., and the changes in acid value, as well as in molecular weight, were measured. At 85° C., no change occurred up to 48 hours. However, after 72 hours elapsed, the acid value rose to 0.3, and after 96 hours, the acid value increased to 5.1, and the molecular weight decreased by 60%. Thus, this showed that aging for three days at 85° C. results in a rise in acid value of not more than 0.2 and a decrease in molecular weight of 10% or less. Similarly, the rise in acid value was 0.2 or less, and the decrease in molecular weight was 10% or less for 5 days at 80° C., for eight days at 75° C., for 14 days at 70° C., for 20 days at 65° C.

Figure 1B:
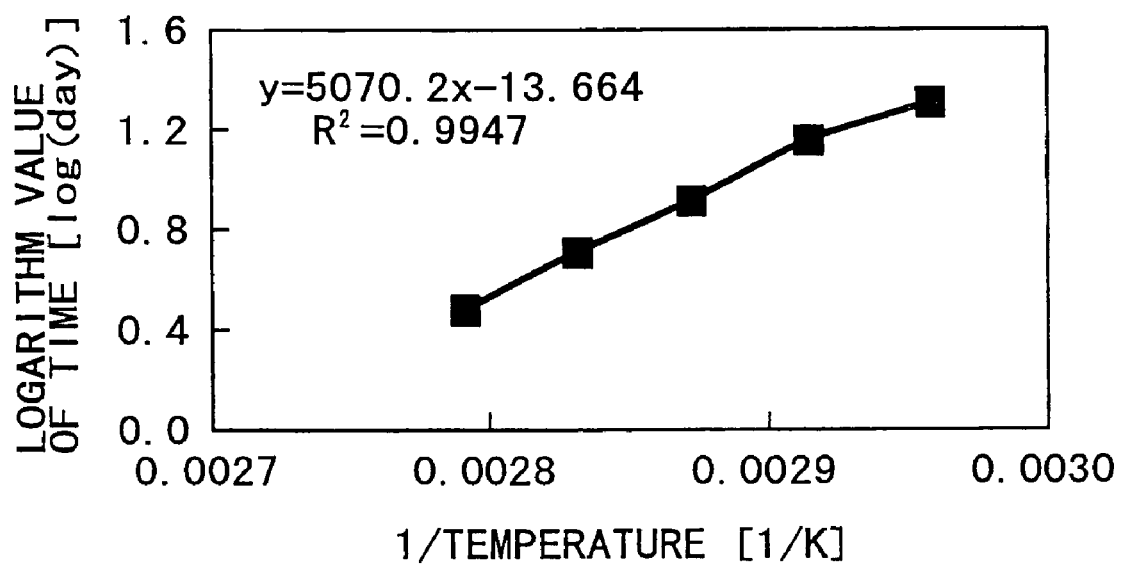
FIG. 1b is a diagram in which the logarithm of time (log (days)) is plotted against the reciprocal of temperature (1/temperature: 1/K), wherein the rise in acid value was not more than 0.2 and the decrease in molecular weight was 10% or less in the example 5.

FIG. 1A is a diagram in which the time (days) and the temperature over and at which, based on the results of the example 5 above, the rise in acid value was 0.2 or less and the decrease in molecular weight was 10% or less are plotted against each other. It is also known that the logarithm of the reaction rate is proportional to the reciprocal of temperature (1/temperature) (the Arrhenius equation), and FIG. 1B plots the reciprocal of temperature (1/temperature) against the logarithm of time (Arrhenius plot) according to the Arrhenius theory. This plot represents a linear relation, and from the gradient and intercept, a relational expression of the temperature and the time it takes until changes in acid value and molecular weight are observed can be obtained as follows:

$$t = (10^{5070 \times (1/273.15 + temperature(° C.) - 13.664)})/365$$

wherein t represents the time (years) it takes to observe a change in acid value and in molecular weight.

According to this equation, the time it takes to observe a rise in acid value and a decrease in molecular weight when subjected to aging at 30° C. and 80% humidity was 3.2 years. Thus, as long as a compound reactive to active hydrogen is added and the acid value is controlled at or below 0.5, it may be expected that physical properties may be maintained for at least 3 years in an environment of 30° C. and 80% relative humidity.

Example 6

An experiment similar to that described in the previously noted example 5 was conducted, except that the amount of carbodiimide added was changed to 2 weight %. FIG. 2A is, like FIG. 1A, a diagram plotting the time (days) and temperature over and at which the rise in acid value is 0.2 or less while the decrease in molecular weight is 10% or less. FIG. 2B is an Arrhenius plot diagram, similar to FIG. 1B. This plot, as with that of FIG. 1B, represents a linear relation, and from the gradient and intercept, a relational expression of the temperature and the time it takes until changes in acid value and molecular weight are observed can be obtained as follows;

$$t=(10^{5312\times(1/273.15+temperature(^\circ C.)-14.065)})/365$$

wherein t represents the time (years) it takes to observe changes in acid value and molecular weight.

According to this equation, the time it takes to observe a rise in acid value and a decrease in molecular weight when subjected to aging at 30° C. and 80% humidity was 7.9 years. Thus, as long as the initial acid value is kept at or below 0.5, and the added amount of the compound reactive to active hydrogen is double that of the example 5, it may be expected that it is possible to maintain physical properties for 8 years under the same aging conditions as those in the previously described example 1. In other words, it was found that the terms during which physical properties can be guaranteed may be set to suit differing product lives by adjusting the added amount of the compound reactive to active hydrogen.

Figure 3A:
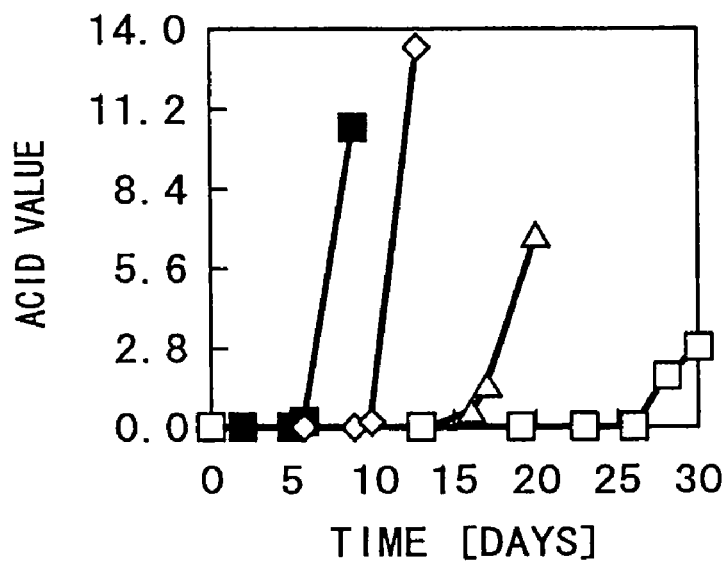
FIG. 3a is a diagram in which the change in acid value is plotted against the time (days) over which physical properties of biodegradable polyester were maintained at each temperature in the example 6.
Figure 3B:
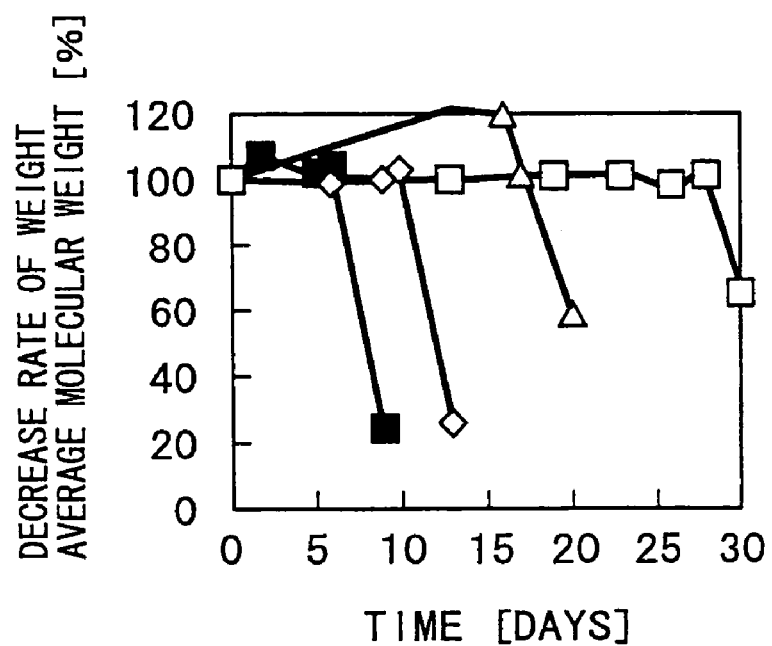
FIG. 3b is a diagram in which the decrease rate (%) of weight-average molecular weight is plotted against the retention time (days) over which physical properties of biodegradable polyester were maintained at each temperature in the example 6.

With respect to each of the samples in the example 6 above, in FIGS. 3A and 3B, changes in acid value and in molecular weight, respectively, when subjected to aging at various temperatures and at 80% humidity, are plotted against time. From the example 6, it was found that the terms of guarantee of the physical properties can be set to suit the differing lives of commercial products by adjusting the amount of additives. Further, as seen in FIGS. 3A and 3B, it also was found that after a certain period had elapsed, hydrolysis accelerated and desirable biodegradability was observed. Further, this hydrolysis was equivalent to that of biodegradable polyesters in which no compound reactive to active hydrogen is present. In other words, it was found that the physical properties may be maintained for the duration of use, while once a period during which physical properties are maintained expires, a biodegradability equivalent to that of biodegradable polyesters may be elicited.

Comparative Example 1

As was done in example 1 above, two kinds of polylactic acids (products of Mitsui Chemicals, Inc. and Shimadzu Corporation) to which no compounds reactive to active hydrogen were added were subjected to aging under the same conditions as those in the example 1. Their acid values were 1.8 each. Subsequent to aging, their molecular weight decreased by 60%, and their flexural strengths dropped to 1/10th the initial value; and thus, they were not at all suitable for use in molding casings.

Comparative Example 2

Without adding any compounds reactive to active hydrogen, the polycaprolactone (brand name: Cellgreen, Grade: PH, product of Daicel Chemical Industries, Ltd.) and polybutylene succinate (brand name: Bionolle #1000, product of Showa High polymer Co., Ltd.) used in the previously described example 3 were blended in a manner similar to that of the previously described example 1. Aging of these blended samples under the same conditions as those of the previously described example 1 (at 80° C. and 80% humidity over 48 hours) caused an 80% decrease in molecular weight. Thus, they were not at all suitable for use in molding casings.

As described above, the biodegradable plastic material of the present invention is a plastic which does not use fossil material and which is biodegradable. Specifically, it is a composition which secures the stability (for three years at 30° C. and 80% humidity) of biodegradable polyesters, and it may be applied to casings of electric appliances and computers which require durability. The biodegradable plastic molding, after the term during which stability is secured lapses, shows hydrolytic properties equivalent to those observed in the absence of compounds reactive to active hydrogen, and it is degraded in culture solutions or soil containing microorganisms and eventually disappears. Accordingly, it is possible to reduce the volume of waste. The biodegradable plastic molding is also useful because it can be manufactured through simple operations.

The preferred embodiments described herein are illustrative and not restrictive, the scope of the present invention being indicated by the appended claims, and all variations which come within the meaning of the claims are intended to be embraced therein.

What is claimed is:

1. The method for manufacturing a biodegradable plastic molding, comprising;
simultaneously or individually adding and blending a silicate and a compound reactive to active hydrogen to a biodegradable plastic material wherein the biodegradable plastic material comprises a polycaprolactone before, while or after melting the biodegradable plastic material, said compound reactive to active hydrogen comprising a bridging agent having a carbodiimide group comprising diisopropylcarbodiimide;
determining the quantity of active hydrogen contained in the biodegradable plastic material treated with the compound reactive to hydrogen by measuring the amount of residual fatty acids; and
molding said biodegradable plastic material.

2. The method for manufacturing a biodegradable plastic molding according to claim 1, wherein said molding comprises film molding, extrusion molding or injection molding.

3. The method for manufacturing a biodegradable plastic molding according to claim 1, wherein a silicon dioxide content of said silicate is 50% or more.

4. The method for manufacturing a biodegradable plastic molding according to claim 1, wherein said silicate takes the form of particles having an average diameter of 50 μm or less.

5. The method for manufacturing a biodegradable plastic molding according to claim 1, wherein said measuring the amount of fatty acids is equivalent to determining the amount of carboxyl groups in the biodegradable plastic molding which is equivalent to determining the amount of active hydrogen.

6. The method for manufacturing a biodegradable plastic molding according to claim 5, wherein measuring the amount of fatty acids employs a 0.02 N KOH-EtOH solution, a phenolphthalein solution, and a phenol red solution as reagents.

* * * * *